United States Patent [19]

King, Jr. et al.

[11] Patent Number: 5,362,840
[45] Date of Patent: Nov. 8, 1994

[54] THERMOPLASTIC RESIN AND METHOD USING VOLATILE, SELF-QUENCHING TERTIARYAMINE CATALYST

[76] Inventors: Joseph A. King, Jr., 927 Vrooman Ave., Schenectady, N.Y. 12309; Klaas Brouwer, Akeleiveld 36, 4613 CL Bergen op Zoom, Netherlands

[21] Appl. No.: 76,038
[22] Filed: Jun. 15, 1993
[51] Int. Cl.$^5$ ............................................. G08G 64/00
[52] U.S. Cl. ................................... 528/199; 528/196; 528/198
[58] Field of Search ..................... 528/199, 198, 196

[56] References Cited

U.S. PATENT DOCUMENTS

| 4,316,980 | 2/1982 | Idel et al. | 528/199 |
| 4,316,981 | 2/1982 | Brunelle | 528/199 |
| 4,360,659 | 11/1982 | Sikar | 528/198 |
| 4,695,620 | 9/1987 | Masumoto et al. | 528/204 |
| 4,880,897 | 11/1989 | Ho et al. | 528/199 |
| 5,025,083 | 6/1991 | Ueda et al. | 528/199 |
| 5,026,817 | 6/1991 | Sakashita et al. | 528/199 |
| 5,149,770 | 9/1992 | Kanno et al. | 528/199 |
| 5,168,112 | 12/1992 | Ueda et al. | 528/199 |

Primary Examiner—John Kight, III
Assistant Examiner—Richard Jones

[57] ABSTRACT

The present invention discloses thermoplastic resins and methods for producing said resins utilizing a single component tertiary amine catalyst system. More particularly, the invention discloses resins such as high molecular weight polycarbonate resins that are produced by a solventless melt condensation reaction between diphenyl carbonate (DPC) and bisphenol A (BPA) in the presence of tertiary amine catalyst.

18 Claims, No Drawings

THERMOPLASTIC RESIN AND METHOD USING VOLATILE, SELF-QUENCHING TERTIARYAMINE CATALYST

The present invention relates to thermoplastic resins and methods for producing said resins utilizing a single component tertiary amine catalyst system. More particularly, the invention relates to resins such as high molecular weight polycarbonate resins that are produced by a solventless melt condensation reaction between diphenyl carbonate (DPC) and bisphenol A (BPA) in the presence of tertiary amine catalyst.

BACKGROUND OF THE INVENTION

A number of catalytic systems have been examined for application to melt polycarbonates. Most of these methods require either a variety of co-catalysts or the subsequent addition of a catalyst quencher to ensure polymer stability. The need for high purity, high quality thermoplastic resins requires the reduction of residual contaminants in the final resin. This need for minimal residual impurities is particularly acute in optical quality (OQ) grade polycarbonate resins. One approach towards elimination of residual solvent contamination (particularly methylene chloride) implements a solventless (melt) process.

Most current melt technology programs employ a two component catalyst system. The first component is tetramethylammonium hydroxide (TMAH or β-catalyst) which is used to initiate oligomer formation in the melt. The TMAH decomposes in the first two reactors to produce a variety of products, some of which contaminate the final polymer. The second catalyst is sodium hydroxide ("sodium" or Na; the α-catalyst) which is the finishing catalyst. Due to its intrinsic stability, the α-catalyst must be quenched. This quenching process requires the addition of yet another component to the polymer formulation. All the materials from the quenching process remain in the final resin, further contaminating the final polymer.

The use of a thermally stable, volatile tertiary amine catalyst circumvents the degradation problem of the β-catalyst and the need for additional reagents due to the use of an α-catalyst. Volatile amines provide the advantage of being "self-quenching" i.e., these catalysts slowly distill from the resin over the course of the reaction. As a result, no additional quencher is needed and no detrimental catalyst residue is left in the final resin.

SUMMARY OF THE INVENTION

A variety of basic tertiary amine catalysts were examined for their efficiency to form high molecular weight thermoplastic resins in general, and polycarbonates in particular. The following amines exhibit excellent polymer build, molecular weight and color: Tributylamine, Trihexylamine, Trioctylamine, Tridodecylamine (TDA), N,N,N',N'-Tetramethylethylenediamine(TMEDA), N,,N',N'-Tetraethylethylenediamine (TEEDA), and 1,4-Dimethylpiperazine.

Early attempts to use organic amines to catalyze the formation of polycarbonate oligomers gave either no reaction or highly colored material, leading to abandonment of this type of approach. Inadequate polymer formation is not a problem in the present invention. High molecular weight polycarbonate resins are readily produced with these "self-quenching" tertiary amines. A variety of polycarbonate grades may be made with applicants' method by merely controlling the catalyst loading and reaction conditions (i.e., temperatures, pressures, and residence times). At a given catalyst loading, the higher the boiling point of the amine, the higher the intrinsic viscosity ("IV") build in the finishing stage of the reaction. This change in finishing reactivity versus amine boiling point is one indication that the catalyst is distilling from the resin. Hard evidence for the "self-quenching" ability of the volatile amine catalysts comes from examination of the overhead distillate from the melt reactor. Gas chromatography ("GC/GCMS") analysis of the overheads indicates the amine catalyst distills unchanged during the course of the reaction. Thus, no undesirable catalyst residue results from the use of these amines. The rate of loss of catalyst from the system is a function of its boiling point and the reaction conditions. Furthermore, the catalysts can be recovered from the overheads and reused if desired.

A number of variations will be immediately apparent to those of skill in the art. In one such variation the amine catalysts can be used in combination in order to optimize the process. Thus, for example, a large amount of a very low boiling amine can be used to rapidly generate oligomers (with/without high end-capping). A small amount of a high boiling amine could then be used as a finishing catalyst in conjunction with the low boiling amine. This combination could be used to produce high molecular weight polymers with an appropriately tailored end-capping percentage.

Of course, the present invention should not be limited to the tertiary amines listed above. Any trialkylamine, peralkyldi- or triamine should effectively catalyze this process. Optimization of the catalyst loading, amine boiling point, reaction temperatures, pressures, and residence times improve the process further.

The invention is also not limited to the BPA homopolymer. Any base-catalyzed reaction for the formation of polycarbonates, polyesters, polyamides, polyestercarbonates, polyesteramides, and polyamidecarbonates, whether branched, unbranched, homo- or copolymers, will work. Other dihydric phenols that can be employed in the practice of this invention include bis(4-hydroxyphenyl)methane, 1,1-bis(4-hydroxyphenyl)ethane, 2,2-bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxyl-3-chlorophenyl)propane, 2,2-bis(4-hydroxy-3,5-dibromophenyl)propane, 1,1-bis(4hydroxyphenyl)cyclohexane, p,p'-dihydroxydiphenyl, 3,3-dichloro-4,4'-dihydroxydiphenyl, bis(4-hydroxyphenyl)ether, bis(4-hydroxyphenyl)sulfone, bis(3,5-dimethyl-4-hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfoxide, bis(3,5-dimethyl-4-hydroxyphenyl)sulfoxide, etc. Additional dihydric phenols can also be employed such as are disclosed in U.S. Pat. Nos. 2,999,835; 3,028,365; 3,153,008; and 4,001,184. It is, of course, possible to employ two or more different dihydric phenols or a copolymer of a dihydric phenol with glycol or with hydroxy or acid terminated polyester, or with a dibasic acid in the event a polycarbonate copolymer or interpolymer (co-polyester-carbonate), rather than a homopolymer, is desired. The preferred dihydric phenol is bisphenol-A (BPA).

Typical of the carbonate esters which may be employed herein are diphenyl carbonate, di(halophenyl)

carbonates such as di-(chlorophenyl) carbonate, di-(bromophenyl) carbonate, di-(trichlorophenyl) carbonate, di(tribromophenyl) carbonate, etc., di-(alkylphenyl) carbonate such as di(tolyl) carbonate, etc., di(naphthyl) carbonate, di-(chloronaphthyl) carbonate, phenyl tolyl carbonate, chlorophenyl chloronaphthyl carbonate, etc., or mixtures thereof. Diphenyl carbonate is preferred.

Finally, the process can be applied to produce oligomeric materials, as well. Thus, either simple or crystalline oligomeric compositions can be generated by the disclosed process. The oligomeric materials can then be polymerized to produce a desired grade of material.

DETAILED DESCRIPTION OF THE PREFERRED EMBODIMENTS

Two experimental reaction sequences were used for polymer preparation. The first is a short run procedure that quickly screens catalyst activity, polymer color, rate of IV build, etc. Its short run times allow efficient, qualitative catalyst screening. A second, longer procedure is used as a secondary check for catalyst activity; the IV builds are always better (higher) under these conditions, but the run times are hours longer. The reactions were all run for prescribed lengths of time rather than polymer build to allow comparison of the catalytic efficiency. The listed IVs do not indicate a limit to the polymer molecular weight these systems could produce if run for extended periods of time. Occasionally, the dispersivities are listed twice for each sample. The first value relates to the use of a molecular weight of 1000 as a cut-off point for sampling while the $(M_w/M_n)_{all}$ represents an alternative practice of reporting the total (non-truncated) GPC data. The reaction materials were from the following sources: BPA and DPC-General Electric; amine catalysts-Aldrich Chemical Company. The reactor vessels were made out of Pyrex ® glass unless specified otherwise. It should be noted that under the disclosed reaction conditions these DPC/BPA compositions do not produce polycarbonate without the addition of catalyst.

The present invention is more fully described in the following illustrative, non-limiting Examples:

EXAMPLE 1

Tributylamine Catalyst

BPA (136.98 g; 0.600 mol) and DPC (141.39 g; 0.660 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). The solution was stirred at 250 rpm. Into this solution was syringed the tributylamine catalyst (36.1ml; $1.5 \times 10^{-4}$ mol). The resulting solution was stirred for 5 min at 180° C. At this time the reaction temperature was raised to 210° C. and the pressure lowered to 200 torr. After a couple of minutes phenol began to distill out of the reactor vessel into an evacuated receiver flask (2 drops/sec). After 25 min, the reactor pressure was lowered to 100 torr and held there for another 25 min. Phenol continued to distill into the receiver flask (1 drop/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/3-5 sec). The final stage of the reaction was initiated by placing the melt material under full vacuum (0.6 torr) at 305° C. for 1 h. The material started foaming before the temperature reached 300° C. and foamed for 6 min. The viscosity started to build immediately after the foaming ceased. The melt polycarbonate appeared colorless with an $IV_{chloroform} = 0.548$ dl/g. $M_w = 29,926$, $M_n = 13,915$, $M_w/M_n = 2.15$.

EXAMPLE 2

Tributylamine Catalyst

BPA (136.98 g; 0.600 mol) and DPC (130.47 g; 0.609 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be slowly stirred to promote better heat exchange. The system was allowed to thermally equilibrate (5-10 min). The solution was stirred at 250 rpm. Into this solution was syringed the tributylamine catalyst (36.1ml; $1.5 \times 10^{-4}$ mol). The resulting solution was stirred for 5 min at 180° C. At this time the reaction temperature was raised to 210° C. and the pressure lowered to 200 torr. After a couple of minutes phenol began to distill from the reactor vessel into an evacuated receiver flask (1 drop/sec). After 25 min, the reactor pressure was lowered to 100 torr and held there for another 25 min. Phenol continued to distill into the receiver flask (2-3 drops/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/2 sec). The final stage of the reaction was initiated by placing the melt material under full vacuum (0.6 torr) at 305° C. for 1 h. The material started to foam after 30 min and continued foaming for 10 min. The melt polycarbonate appeared colorless with an $IV_{chloroform} = 0.34$ dl/g. The receiver mass (distillate; phenol+DPC+BPA)=123.8 g; theoretical distillate mass (phenol+DPC$_{excess}$)=116.1 g. Polymer yield was 148.2 g or 97.2%. $M_w = 10,827$, $M_n = 5,707$, $M_w/M_n = 1.90$, $(M_w/M_n = 2.63)_{all}$.

EXAMPLE 3

Tributylamine Catalyst

BPA (136.98 g; 0.600 mol) and DPC (141.39 g; 0.660 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). The solution was stirred at 250 rpm. Into this solution was syringed the tributylamine catalyst (36.1 ml; $1.5 \times 10^{-4}$ mol). The resulting solution was stirred for 5 min at 180° C. At this time the reaction temperature was raised to 210° C. and the pressure lowered to 200 torr. After a couple of minutes phenol began to distill out of the reactor vessel into an evacuated receiver flask (1 drop/6 sec). After 25 min, the reactor pressure was lowered to 100 torr and held there for another 25 min. Phenol continued to distill into the receiver flask (1 drop/2 sec). The reactor pressure was lowered to 15 torr while the temperature was raised to 250° C. These conditions were held for 30 min (approx. 3 drops/sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (1.1 torr at the reactor head) at 305° C. for 1 h. The material began to foam after 10 min and continued foaming for 7 min. The melt polycarbonate appeared colorless with an $IV_{chloroform}=0.353$ dl/g. The receiver mass (distillate; phenol+DPC+BPA$_{trace}$)=137.7 g; theoretical distillate mass (phenol+DPC$_{excess}$)=125.8 g. Polymer yield was 145.3 g or 95.3%; $M_w=12,057$, $M_n=6,233$, $M_w/M_n=1.93$, $(M_w/M_n=2.64)_{all}$.

EXAMPLE 4

Tributylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). The solution was stirred at 250 rpm. Into this solution was syringed the tributylamine catalyst (180.4 ml; $7.5 \times 10$ mol). The resulting solution was stirred for 5 min at 180° C. At this time the reaction temperature was raised to 210° C. and the pressure lowered to 175 torr. After a couple of minutes phenol began to distill out of the reactor vessel into an evacuated receiver flask (3–8 drops/sec). After 25 min, the reactor pressure was lowered to 100 torr and held there for another 25 min. Phenol continued to distill into the receiver flask (5–8 drops/sec). The reactor pressure was lowered to 15 torr while the temperature was raised to 250° C. These conditions were held for 30 min (approx. 1 drop/sec flow). The pressure was dropped to 2 torr while the temperature was increased to 285° C. (about 1 drop/sec flow). These conditions were maintained for 10 min. The final stage of the reaction was initiated by placing the melt material under full vacuum (0.6 torr) at 305° C. for 1 h. Foaming began after 5 min at 305° C. an continued for about 6 min. The melt polycarbonate appeared colorless with an $IV_{chloroform}=0.370$ dl/g. The receiver mass (distillate; phenol+DPC +BPA$_{trace}$)=122.2 g; theoretical distillate mass (phenol+DPC$_{excess}$)=118.1 g. Polymer yield was 149.38 or 98.2%; $M_w=13,544$, $M_n=6,947$, $M_w/M_m=96$, $(M_w/M_n)_{all}=2.64$.

EXAMPLE 5

Trihexylamine Catalyst

BPA (136.98 g; 0.600 mol) and DPC (141.39 g; 0.660 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (15 min). Into this solution was syringed the trihexylamine catalyst (53.0 ml; $1.5 \times 10^{-4}$ mol). The resulting solution was stirred for 30 min at 180° C. the stirring rate was kept at 250 rpm unless otherwise noted. At this time the reaction temperature was raised to 210° C. and the pressure lowered to 200 torr. After a couple of minutes phenol began to distill from the reactor vessel into an evacuated receiver flask (1 drop/6 sec). The conditions were held constant for 50 min. The reactor temperature was raised to 240° C. and held there for 20 min. Twenty minutes later, the pressure was decreased to 150 torr and held there for 20 min. the pressure was then lowered to 100 torr and held there for 20 min. The vacuum was increased to 15 torr. The conditions were held for 15 min (approx. 1 drop/sec flow). At constant pressure, the temperature was increased to 270° C. (about 1 drop/sec flow) and then the pressure was dropped to full vacuum (0.60 torr). These conditions were maintained for 50 min (flow to receiver approx. 1 drop/5 sec). Foaming began after 12 min and continued for 8 min. The final stage of the reaction was initiated by bringing the melt material to 300° C. for 30 min. At constant temperature and pressure, the stirring was then reduced from 250 to 150 rpm and held for 10 min. The stirring rate was reduced to 50 rpm and held for 10 min. The melt polycarbonate appeared colorless with an $IV_{chloroform}=0.499$ dl/g. The receiver mass (distillate; phenol+DPC+BPA$_{trace}$)=126.3 g; theoretical distillate mass (phenol+DPC$_{excess}$)=125.8 g. Polymer yield was 152.1 or 99.8%; $M_w=24,734$, $M_n=12,270$, $M_w/M_n=2.03$, $(M_w/M_n)_{all}=2.51$.

EXAMPLE 6

Trihexylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was syringed the trihexylamine catalyst (53.0 ml; $1.5 \times 10^{-4}$ mol). The resulting solution was stirred for 5 min at 180° C. The stirring was held at 250 rpm unless otherwise noted. At this time the reaction temperature was raised to 210° C. and the pressure lowered to 175 torr. After a couple of minutes phenol began to distill out of the reactor vessel into an evacuated receiver flask (1 drop/sec). After 25 min, the reactor pressure was lowered to 100 torr and held there for another 25 min. Phenol continued to distill into the receiver flask (very slow flow). The reactor pressure was lowered to 15 torr while the temperature was raised to 250° C. These conditions were held for 30 min (approx. 1 drop/5 sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (0.5 torr) at 305° C. for 1 h. Foaming began after 20 min at 305° C. and continued for about 8 min. The melt polycarbonate appeared colorless with an $IV_{chloroform}=0.383$ dl/g. The receiver mass (distillate; phenol+DPC+BPA$_{trace}$)=121.8 g; theoretical distillate mass (phenol+DPC$_{excess}$)=118.1 g. Polymer yield was 149.9 or 98.4%; $M_w=14,663$, $M_n=7,360$, $M_w/M_n=1.98$, $(M_w/M_n)_{all}=2.67$.

EXAMPLE 7

Trihexylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). The reaction solution was stirred at 250 rpm unless otherwise stated. Into this solution was syringed the trihexylamine catalyst (53.0 ml; $1.5\times10^{-4}$ mol). The resulting solution was stirred for an additional 5 min at 180° C. At this time the reaction temperature was raised to 210° C. and the pressure lowered to 175 torr. After a couple of minutes phenol began to distill out of the reactor vessel into an evacuated receiver flask (very slow flow to receiver). After 25 min, the reactor pressure was lowered to 100 torr and held there for another 25 min. Phenol continued to distill into the receiver flask (1 drop/2 sec). The reactor pressure was lowered to 15 torr while the temperature was raised to 250° C. These conditions were held for 30 min (approx. 3 drops/sec flow). The pressure was dropped to 2 torr while the temperature was increased to 285° C. These conditions were maintained for 10 min (flow to receiver approx. 1 drop/3 sec). The final stage of the reaction was initiated by placing the melt material under full vacuum (1.0 torr) at 305° C. for 0.5h. Foaming began after 15 min at 305° C. and continued for about 8 min. The melt polycarbonate appeared colorless with an $IV_{chloroform}=0.364$ dl/g. The receiver mass (distillate; phenol+DPC+BPA$_{trace}$)=121.5 g; theoretical distillate mass (phenol+DPC$_{excess}$)=118.1 g. Polymer yield was 150.1 or 98.5%; $M_w=13,071$, $M_n=6,713$, $M_w/M_n=1.96$, $(M_w/M_n)_{all}=2.60$. This reaction was used as duplicate of the preceding experiment. A shorter residence time in the final reaction stage was the only variable changed; hence, a slightly lower IV was produced.

EXAMPLE 8

Trihexylamine Catalyst

BPA (136.98 g; 0,600 mol) and DPC (133.67 g; 0,624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was syringed the trihexylamine catalyst (265 ml; $7.5\times10^{-4}$ mol). The resulting solution was stirred for 5 min at 180° C. The reaction solution was stirred at 250 rpm unless otherwise stated. At this time the reaction temperature was raised to 210° C. and the pressure lowered to 175 torr. After a couple of minutes phenol began to distill out of the reactor vessel into an evacuated receiver flask (3–5 drops/sec). After 25 min, the reactor pressure was lowered to 100 torr and held there for another 25 min. Phenol continued to distill into the receiver flask (1 drop/2 sec). The reactor pressure was lowered to 15 torr while the temperature was raised to 250° C. These conditions were held for 30 min (approx. 1 drops/sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (2.8 torr at the reactor head) at 305° C. for 1 h. Foaming began just prior to the reaction reaching 305° C. and before the pressure was lowered from 2 torr (at the pump not reactor head) to full vacuum (0.7 torr). Foaming continued for about 9 min. After twenty-five minutes the stirring rate had to be lowered to 150 rpm due to the increasing viscosity's load on the agitator. The melt polycarbonate appeared colorless with an $IV_{chloroform}=0.471$ dl/g. The receiver mass (distillate; phenol+DPC+BPA$_{trace}$)=116.3 g; theoretical distillate mass (phenol+DPC$_{excess}$)=118.1 g. Polymer yield was 153.8 or quantitative; $M_w=22,844$, $M_n=11,033$, $M_w/M_n=2.08$, $(M_w/M_n)_{all}=2.71$.

EXAMPLE 9

Trihexylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was syringed the trihexylamine catalyst (265 ml; $7.5\times10^{-4}$ mol). The resulting solution was stirred for 5 min at 180° C. The stirring rate held at 250 rpm unless otherwise stated. At this time the reaction temperature was raised to 210° C. and the pressure lowered to 175 torr. After a couple of minutes phenol began to distill out of the reactor vessel into an evacuated receiver flask (3-5 drops/sec). After 25 min, the reactor pressure was lowered to 100 torr and held there for another 25 min. Phenol continued to distill into the receiver flask (1 drop/2 sec). The reactor pressure was lowered to 15 torr while the temperature was raised to 250° C. These conditions were held for 30 min (approx. 1 drop/5 sec flow). The pressure was dropped to 2 torr while the temperature was increased to 285° C. These conditions were maintained for 10 min (flow to receiver approx. 1 drop/3 sec). Foaming began after 8 min and the viscosity began to build. The final stage of the reaction was initiated by placing the melt material under full vacuum (0.6 torr at the pump head) at 305° C. for 0.5 h. The pressure at the reactor head never fell below 3.2 torr. The melt polycarbonate appeared colorless with an $IV_{chloroform}=0.499$ dl/g. The receiver mass (distillate; phenol+$DPC_{excess}$)=115.1 g; theoretical distillate mass (phenol $DPC_{excess}$)=118.1 g. Polymer yield was 155.4 or quantitative; $M_w=26,102$, $M_n=12,489$, $M_w/M_n=2.07$, $(M_w/M_n)_{all}=2.61$. The more passive (harder/inert) quartz surface appears to facilitate the rate of polymer formation.

EXAMPLE 10

Trioctylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). Into this solution was syringed the trioctylamine catalyst (69.8 ml; $1.5 \times 10^{-4}$ mol). The resulting solution was stirred for 5 min at 180° C. The reaction solution was stirred at 250 rpm unless otherwise stated. At this time the reaction temperature was raised to 210° C. and the pressure lowered to 175 torr. After a couple of minutes phenol began to distill out of the reactor vessel into an evacuated receiver flask (1 drop/3 sec). After 25 min, the reactor pressure was lowered to 100 torr and held there for another 25 min. Phenol continued to distill into the receiver flask (1 drop/sec). The reactor pressure was lowered to 15 torr while the temperature was raised to 250° C. These conditions were held for 30 min (approx. 1 drop/2 sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (1.0 torr reactor head pressure) at 305° C. for 0.75h. Foaming began after 18 min at 305° C. and continued for about 10 min. The melt polycarbonate appeared colorless with an $IV_{chloroform}=0.370$ dl/g. The receiver mass (distillate; phenol+DPC+$BPA_{trace}$)=121.3 g; theoretical distillate mass (phenol+$DPC_{excess}$)=118.1 g. Polymer yield was 150.3 or 98.5%. $M_w=13,570$, $M_n=6,921$, $M_w/M_n=1.96$, $(M_w/M_n)_{all}=2.57$.

EXAMPLE 11

Tributylamine/trihexylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). The solution was stirred at 250 rpm unless otherwise stated. Into this solution was syringed the tributylamine (361 ml; $1.5 \times 10^{-3}$ mol) and trihexylamine (53.0 ml; $1.5 \times 10^{-4}$ mol) catalysts. The resulting solution was stirred for 5 min at 180° C. At this time the reaction temperature was raised to 210° C. and the pressure lowered to 175 torr. The phenol began to distill out of the reactor vessel into an evacuated receiver flask immediately (3-5 drops/sec). After 25 min, the reactor pressure was lowered to 100 torr and held there for another 25 min. Phenol continued to distill into the receiver flask (1-3 drops/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/3 sec). The final stage of the reaction was initiated by placing the melt material under full vacuum (0.62 torr at the reactor head) at 305° C. for 0.5 h. Foaming began after 10 min at 305° C. and continued for about 10 min. The stirring rate was lowered to 150 rpm after 25 min. The melt polycarbonate appeared colorless with an $IV_{chloroform}=0.411$ dl/g. The receiver mass (distillate; phenol+DPC+$BPA_{trace}$)=122.65 g; theoretical distillate mass (phenol+$DPC_{excess}$)=118.1 g. Polymer yield was 149.4 or 98.0%. $M_w=16,856$, $M_n=8,377$, $M_w/M_n=2.01$, $(M_w/M_n)_{all}=2.66$.

EXAMPLE 12

Tributylamine/trioctylamine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). The solution was stirred at 250 rpm unless otherwise stated. Into this solution was syringed the tributylamine (361 ml; $1.5 \times 10^{-3}$ mol) and trioctylamine (69.8 ml; $1.5 \times 10^{-4}$ mol) catalysts. The resulting solution was stirred for 5 min. At this time the reaction temperature was raised to 210° C. and the pressure lowered to 175 torr. The phenol began to distill out of the reactor vessel into an evacuated receiver flask immediately (3-5 drops/sec). After 25 min, the reactor pressure was lowered to 100 torr and held there for another 25 min. Phenol continued to distill into the receiver flask (1-3 drops/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/3 sec). The final stage of the reaction was initiated by placing the melt material under full vacuum (0.72 torr at the reactor head) at 305° C. for 0.75h. Foaming began after 18 min at 305° C. and continued for about 9 min. The melt polycarbonate appeared colorless with an $IV_{chloroform}=0.426$ dl/g. The receiver mass (distillate; phenol+DPC+BPA$_{trace}$)=122.61 g; theoretical distillate mass (phenol+DPC$_{excess}$)=118.1 g. Polymer yield was 149.4 or 98.4%. $M_w=18,514$, $M_n=9,214$, $M_w/M_n=2.00$, $(M_w/M_n)_{all}=2.60$.

EXAMPLE 13

Tridodecylamine Catalyst

BPA (136.98 g; 0,600 mol) and DPC (138.9 g; 0,648 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). Into this solution was syringed the tridodecylamine catalyst (95 μl; $1.5\times10^{-4}$ mol). The resulting solution was stirred for 5 min at 180° C. The reaction solution was stirred at 250 rpm unless otherwise stated. At this time the reaction temperature was raised to 210° C. and the pressure lowered to 175 torr. After a couple of minutes phenol began to distill out of the reactor vessel into an evacuated receiver flask (1 drop/3 see). After 35 min, the reactor pressure was lowered to 100 tort and held there for another 35 min. Phenol continued to distill into the receiver flask (1 drops/see). The reactor pressure was lowered to 15 torr while the temperature was raised to 240° C. These conditions were held for 40 min (approx. 1 drop/2 sec flow). The pressure was dropped to 2 torr while the temperature was increased to 270° C. These conditions were maintained for 20 min (flow to receiver approx. 1 drop/5 sec). The final stage of the reaction was initiated by placing the melt material under full vacuum (0.11 torr; 1.0 torr reactor head pressure) at 300° C. for 1.5h. Foaming began after 25 min at 300° C. and continued for about 10 min. The melt polycarbonate appeared colorless. The receiver mass (distillate; phenol+DPC+BPA$_{trace}$)=128.5 g; theoretical distillate mass (phenol+DPC$_{excess}$)=123.2 g. Polymer yield was 147 g or 96.5%. $M_w=34,960$, $M_n=15,103$, $M_w/M_n=2.315$, $(M_w/M_n)_{all}=2.72$.

EXAMPLE 14

Tridodecylamine Catalyst

BPA (136.98 g; 0.600 mol) and DPC (138.9 g; 0.648 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). Into this solution was syringed the tridodecylamine catalyst (475 μl; $7.5\times10^{-4}$ mol). The resulting solution was stirred for 5 min at 180° C. The reaction solution was stirred at 250 rpm unless otherwise stated. At this time the reaction temperature was raised to 210° C. and the pressure lowered to 175 torr. After a couple of minutes phenol began to distill out of the reactor vessel into an evacuated receiver flask (3-5 drops/sec). After 35 min, the reactor pressure was lowered to 100 torr and held there for another 35 min. Phenol continued to distill into the receiver flask (1 drops/2 sec). The reactor pressure was lowered to 15 torr while the temperature was raised to 240° C. These conditions were held for 40 min (approx. 1 drop/sec flow). The pressure was dropped to 2 torr while the temperature was increased to 270° C. These conditions were maintained for 20 min (flow to receiver approx. 1 drop/5 sec). The final stage of the reaction was initiated by placing the melt material under full vacuum (torr at the reactor head) at 300° C. for 1.5 h. Foaming began 10 min after the reaction reached 300° C. and continued for about 9 min. After one hour, the stirring rate had to be lowered to 100 rpm due to the increasing viscosity's load on the agitator. The melt polycarbonate appeared colorless. The receiver mass (distillate; phenol+DPC+BP$_{trace}$)=121.5 g; theoretical distillate mass (phenol+DPC$_{excess}$)=123.2 g. Polymer yield was 154.4 g or quantitative. $M_w=42,800$, $M_n=17,750$, $M_w/M_n=2.41$, $(M_w/M_n)_{all}=2.76$.

EXAMPLE 15

N,N,N'N'-Tetramethylenediamine (TMEDA) Catalyst

BPA (136.98 g; 0,600 mol) and DPC (133.67 g; 0,624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). Into this solution was syringed the TMEDA catalyst (114.3 ml; $7.5\times10^{-4}$ mol). The resulting solution was stirred for 5 min at 180° C. At this time the reaction temperature was raised to 210° C. and the pressure lowered to 175 torr. After a couple of minutes phenol began to distill out of the reactor vessel into an evacuated receiver flask (3-5 drops/sec). After 25 min, the reactor pressure was lowered to 100 torr and held there for another 25 min. Phenol continued to distill into the receiver flask (3 drops/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (0.6 torr) at 305° C. for 0.5 h. Foaming began after 15 min at 305° C. and continued for about 10 min. The melt polycarbonate appeared colorless with an $IV_{chloroform}=0.423$ dl/g. The receiver mass (distillate; phenol+DPC+BPA$_{trace}$)=121.1 g; theoretical distillate mass (phenol+DPC$_{excess}$)=118.1 g. Polymer yield was 150.6 or 98.6%. $M_w=17,497$, $M_n=8,753$, $M_w/M_n=2.00$, $(M_w/M_n)_{all}=2.64$.

EXAMPLE 16

N,N,N',N'-Tetraethylethylenediamine (TEEDA) Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). Into this solution was stirred the TEEDA catalyst (163.2 ml; $7.5 \times 10^{-4}$ mol). The resulting solution was stirred for 5 min at 180° C. The stirring rate was kept at 250 rpm unless otherwise stated. At this time the reaction temperature was raised to 210° C. and the pressure lowered to 175 torr. After a couple of minutes phenol began to distill from the reactor vessel into an evacuated receiver flask (3 drops/sec). After 25 min, the reactor pressure was lowered to 100 torr and held there for another 25 min. Phenol continued to distill into the receiver flask (1 drops/3-5 sec). The reactor pressure was lowered to 15 torr while the temperature was raised to 250° C. These conditions were held for 30 min (approx. 1-2 drop/sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (0.9 torr at the reactor head) at 305° C. for 1 h. Foaming began after 25 min at 305° C. and continued for about 13 min. The melt polycarbonate appeared colorless with an $IV_{chloroform}=0.387$ dl/g. The receiver mass (distillate; phenol+DPC+BPA$_{trace}$)=120.5 g; theoretical distillate mass (phenol+DPC$_{excess}$)=118.1 g. Polymer yield was 150.8 or 99.0%. $M_w=15,047$, $M_n=7,628$, $M_w/M_n=2.00$, $(M_w/M_n)_{all}=2.75$.

EXAMPLE 17

1,4-Dimethylpiperazine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5-10 min). Into this solution was syringed the 1,4-dimethylpiperazine catalyst (103.5 ml; $7.5 \times 10^{-4}$ mol). The resulting solution was stirred for 5 min at 180° C. The stirring rate was kept at 250 rpm unless otherwise noted. At this time the reaction temperature was raised to 210° C. and the pressure lowered to 175 torr. After a couple of minutes phenol began to distill from the reactor vessel into an evacuated receiver flask (5 drops/sec). After 25 min, the reactor pressure was lowered to 100 torr and held there for another 25 min. Phenol continued to distill into the receiver flask (2 drops/sec). The reactor pressure was lowered to 15 torr while the temperature was raised to 250° C. These conditions were held for 30 min (approx. 1-2 drop/sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (0.9 torr) at 305° C. for 0.75h. Foaming began after 30 min at 305° C. and continued for about 6 min. The melt polycarbonate appeared colorless with an $IV_{chloroform}=0.378$ dl/g. The receiver mass (distillate; phenol+DPC+BPA$_{trace}$)=121.0 g; theoretical distillate mass (phenol+DPC$_{excess}$)=118.1 g. Polymer yield was 150.3 or 98.7%. $M_w=14,108$, $M_n=7,189$, $M_w/M_n=1.96$, $(M_w/M_n)_{all}=2.63$.

The foregoing examples were given by way of illustrations of the invention and are not to be construed as a limitation thereof. Obviously, other modifications and variations of the present invention are possible in light of the above teachings. It is therefore to be understood that changes may be made in the particular embodiments of the invention described which are within the full intended scope of the invention defined by the appended claims.

What is claimed is:

1. An improved process for preparing a polycarbonate resin, wherein said resin is prepared from a dihydric phenol; a copolymer of a dihydric phenol with a glycol, a hydroxy terminated ester or an acid terminated ester; or a dibasic acid in a melt condensation process wherein the improvement comprises conducting the condensation reaction in the presence of a tertiary amine catalyst selected from the group consisting of trialkylamines, peralkyldiamines, peralkyltriamines and mixtures thereof wherein the boiling point of the amine is such that the amine catalyst distills unchanged overhead during the course of the reaction whereby no undesirable catalyst residue in the resin results from the use of the catalyst.

2. A process according to claim 1, wherein said tertiary amine is selected from the group consisting of
   tributylamine, trihexylamine, trioctylamine, ttridodecylamine, N, N, N', N'-tetramethylethylenediamine, N, N, N', N'-tetraethylethylenediamine, and 1,4-dimethylpiperazine.

3. A melt condensation process for preparing a polycarbonate wherein diphenyl carbonate is reacted with bisphenol A in the presence of a volatile tertiary amine catalyst selected from the group consisting of trialkylamines, peralkyldiamines and peralkyltriamines.

4. A process according to claim 3, wherein said tertiary amine is selected from the group consisting of
   tributylamine, trihexylamine, trioctylamine, ttridodecylamine, N, N, N', N'-tetramethylethylenediamine, N, N, N', N'-tetraethylethylenediamine, and 1,4-dimethylpiperazine.

5. An improved process for preparing a polycarbonate wherein a dihydric phenol and a carbonate ester are melt condensed in the presence of a volatile tertiary amine catalyst.

6. A process according to claim 5 wherein said tertiary amine is selected from the group consisting of tributylamine (TBA), trihexylamine (THA), trioctylamine (TOA), ttridodecylamine (TDA), N, N, N', N'-tetramethylethylenediamine, N, N, N', N'-tetraethylethylenediamine, and 1,4-dimethylpiperazine.

7. A process according to claim 5 wherein said dihydric phenol and said carbonate ester are reacted using a 1 to 25 molar excess of said carbonate ester.

8. An improved polycarbonate resin, wherein the improvement comprises the reduction of impurities through the preparation of said resin by a solventless melt condensation process in the presence of a volatile tertiary amine catalyst selected from the group consisting of trialkylamines, peralkyldiamines and peralkyltriamines whereby the polycarbonate resin is free of undesirable catalyst residue.

9. A resin according to claim 8, wherein said tertiary amine is selected from the group consisting of tributylamine, trihexylamine, trioctylamine, ttridodecylamine, N, N, N', N'-tetramethylethylenediamine, N, N, N', N'-tetraethylethylenediamine, and 1,4-dimethylpiperazine, 10. A melt-condensed polycarbonate according to claim 8, wherein said tertiary amine is selected from the group consisting of tributylamine, trihexylamine, trioctylamine, ttridodecylamine, N, N, N', N'-tetramethylethylenediamine, N, N, N', N'-tetraethylethylenediamine, and 1,4-dimethylpiperazine.

11. A melt-condensation process for preparing a polycarbonate resin comprising the steps of:
    (a) mixing the component parts of said polycarbonate resin and a volatile tertiary amine catalyst selected from the group consisting of trialkylamines, peralkyldiamines, peralkyltriamines and mixtures thereof in a suitable reaction vessel;
    (b) gradually increasing the temperature within said vessel; and
    (c) gradually decreasing the pressure in said reaction vessel;
    wherein the boiling point of the tertiary amine catalyst is such that the catalyst distills unchanged overhead during the course of the reaction whereby the resulting thermoplastic resin is substantially free of catalytic contaminants.

12. A process according to claim 11 wherein said components parts are bisphenol-A and diphenyl carbonate.

13. A process according to claim 11 wherein said temperature ranges from about 180° C. to 350° C.

14. A process according to claim 11 wherein said pressure ranges from about 200 torr to about 0.1 torr.

15. The process of claim 11 wherein the tertiary amine catalyst is a trialkylamine.

16. The process of claim 11 wherein the tertiary amine catalyst is a peralkyldiamine.

17. The process of claim 11 wherein the tertiary amine catalyst is a peralkyltriamine.

18. The process of claim 11 wherein the tertiary amine catalyst is a mixture of tertiary amines.

* * * * *